Jan. 8, 1963 W. A. BOEMLE 3,072,098
COLLAR FOR PREVENTING FUR CHEWING
Filed Feb. 14, 1962 2 Sheets-Sheet 1

*INVENTOR*

Wayne A. Boemle

Jan. 8, 1963 W. A. BOEMLE 3,072,098
COLLAR FOR PREVENTING FUR CHEWING
Filed Feb. 14, 1962 2 Sheets-Sheet 2
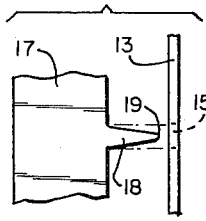
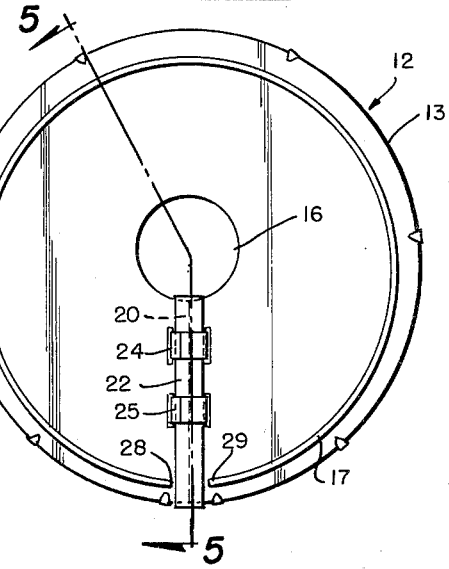
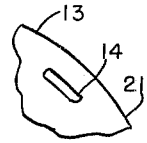
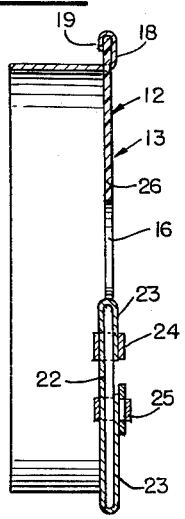
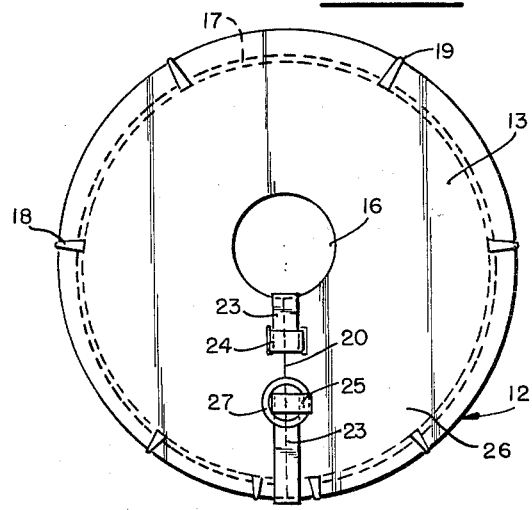
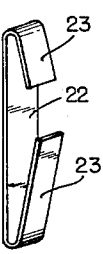
*INVENTOR*
Wayne A. Boemle

United States Patent Office 3,072,098
Patented Jan. 8, 1963

3,072,098
COLLAR FOR PREVENTING FUR CHEWING
Wayne A. Boemle, 2519 N. Lafayette Ave.,
Evansville, Ind.
Filed Feb. 14, 1962, Ser. No. 173,194
1 Claim. (Cl. 119—106)

This invention relates to mammalias and more particularly to a gnawing mammalia of the rodent class, scientifically known as a hystricomorphic rodent of the genus "Chinchilla." These mammals as they are more often called have been valued for their fur for as long as 1000 A.D. Their breeding, while still in its infancy, is fast becoming a financially profitable business.

One of the pitfalls of the fur farmer as breeders of chinchillas are called, is the problem of keeping them from chewing their own fur and thus reducing or totally ruining their market value.

It is, therefore, an object of this invention to provide a device in the form of a removable collar that is placed around the neck of each chinchilla to prevent this very objectionable gnawing of their fur.

Another object of this invention is to provide a collar for preventing fur chewing that will not be too heavy for the mammal to wear.

Another object of this invention is to provide a collar for preventing fur chewing that will not in any way harm the chinchilla.

Another object of this invention is to provide a collar for preventing fur chewing that can be mass produced at a price attractive to every fur farmer who breeds the chinchilla.

Another object of this invention is to provide a collar for preventing fur chewing that will not become jammed once it has been secured around the chinchilla's neck and can, therefore, be easily removed at will by the farmer.

Another object of this invention is to provide a collar for preventing fur chewing that has a minimum number of parts, none of which are complicated in design and construction.

Another object of this invention is to provide a collar for preventing fur chewing that can readily be manufactured from any number of materials.

Another object of this invention is to provide a collar for preventing fur chewing that can be placed on or removed from a chinchilla's neck by even the most inexperienced person in the art of handling these mammals.

Another object of this invention is to provide a collar for preventing fur chewing that will not have any projections that can harm another chinchilla should two or more of the mammals come together in the fur farm.

Still another object of this invention is to provide a collar for preventing fur chewing that is designed with sanitation as a prime object and will have little, if any, tendency to collect and hold dirt, and can quickly be cleaned whenever so desired.

Other and further objects and advantages of this collar for preventing fur chewing will be hereinafter described, and the novel features thereof defined in the appended claim.

Referring to the drawing:

FIGURE 4 is an enlarged front view of this invention assembled and looking towards the back;

FIGURE 5 is a sectional view of this invention taken substantially along line 5—5 of FIGURE 4 as viewed in the direction indicated by the arrows;

FIGURE 6 is an enlarged back view of this invention assembled looking towards the front;

FIGURE 7 is an enlarged exploded side view of a portion of the two major parts of this invention about to be assembled;

FIGURE 8 is an enlarged detail of a fragment of one of the major parts of this invention;

FIGURE 9 is an enlarged pictorial view of that detail of this invention that is herein called a strap.

Similar reference characters refer to similar parts throughout the several views of the drawing.

Figure 1:
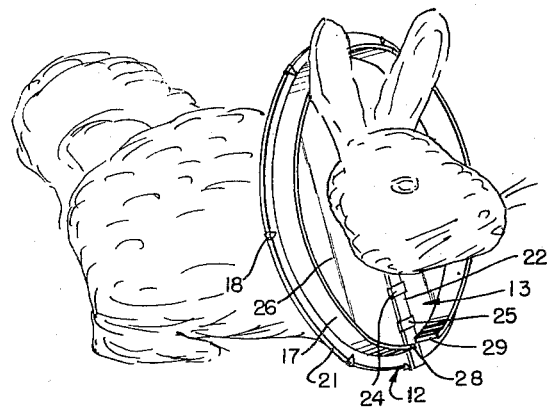
FIGURE 1 is a pictorial view of this invention in place on the neck of a chinchilla which is shown in phantom lines.

Having reference to the drawing in detail, there is generally indicated by the character 12 a collar for preventing fur chewing embodying a disk 13 having a plurality of radially spaced rectangular recesses 14 in spaced relation to each other in the periphery thereof and a plurality of radially spaced elongated openings 15 in spaced relation to each other and in radial line with the aforesaid recesses 14. The disk is also provided with a centrally located circular opening 16 for the head of the chinchilla to project through when this invention is placed on the neck of the same.

A ring 17 that is of any desired thin material is secured to the aforesaid disk 13 by a plurality of trapezoidal-shaped arms 18 projecting from the edge of the periphery thereof and in radial spaced relation to each other and in line with the elongated openings 15 in disk 13. The purpose of the aforesaid ring 17 is, of course, to provide extra stability to the disk 13. The diameter of the ring 17 being smaller than the diameter of the disk 13 to which it is attached by the said arms 18 projecting through the said elongated openings 15 in disk 13 and then bend with end 19 projecting through the rectangular recessed 14 and then bend again at right angle to the said disk 13 as clearly shown in FIGURE 5 of the appended drawing. The assembly just described obviously secures the said disk 13 to the ring 17.

Figure 2:
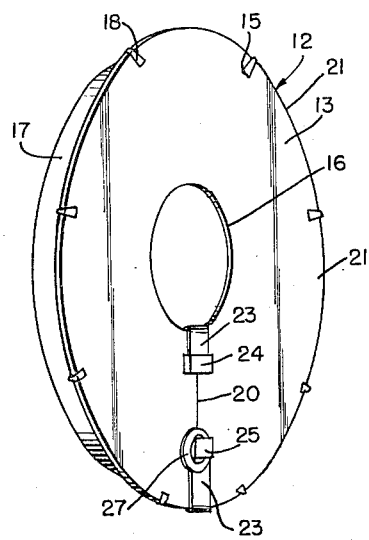
FIGURE 2 is an enlarged pictorial view of this invention after it has been assembled and as seen looking from back to front.
Figure 3:
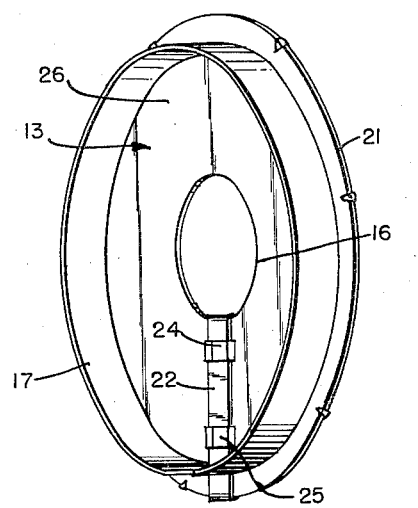
FIGURE 3 is an enlarged pictorial view of this invention after it has been assembled and seen looking from front to back.

Returning now to the disk 13 it is seen on examination of FIGURES 2 and 5 of the appended drawings that this member is radially slit at 20 from the circular opening 16 to its outer edge herein designated for the first time by the reference character 21. The purpose for the slit 20 is to permit this invention to be sprung open so as to permit the same to be placed over the head of the chinchilla.

A strap 22 having U-shaped ends 23 is placed on the back side of the disk 13 and straddles its slit 20 to provide a lock for the collar once it has been placed on the chinchilla's neck. One of the U-shaped ends 23 projects through the circular opening 15 and is held down securely against the front side of the said disk 13 by means of a U-shaped staple 24 while an alike staple 25 secures the other one of the U-shaped ends 23 that projects beyond the periphery (outer edge 21) of the said disk 13 and lays flat against its front side 26 as one can readily see by looking at the appended drawings. The disk 13 is of course provided with necessary elongated openings for the ends of the staples 24 and 25 to project through, these openings are not designated by any reference character on the appended drawings. A rather heavy washer 27 is secured to the back side of staple 25 after this invention has been placed on the neck of the chinchilla by any desired means for a twofold purpose, namely to prevent this collar from becoming unfastened and working off the chinchilla's neck and to also hold the collar in its desired position and therefore prevents this device from ever injuring the chinchilla's genital organs which it can keep clean by lack of obstructions to these parts of its body since the aforesaid ring 17 is not actually a complete circle but has ends 28 and 29 that stop just short of the said strap 22 as clearly shown in FIGURES 1 and 4 of the appended drawings.

The construction of this novel invention has now been fully described and its method of use obvious to all who can read the appended drawings wherein it is seen at a glance that the ring 17 is first fastened securely to the front side 26 of the disk by having its, the ring's trapezoidal shaped arms 18 placed through the elongated openings 15 in the said disk 13 and then have the end 19 bent downward through the recess 14 in the periphery of the disk 13 as previously described and best illustrated by FIGURE 5 of the appended drawings. The collar 12 is now sprung open by having one grasp the same in their hands and pulling each hand slightly away from the other hand thus causing the disk 13 to open at the slit 20 so that the collar can be placed around the neck of the chinchilla after which the collar is released and the two edges of the slit come together. The strap 22 is placed over the same with one of its U-shaped ends 23 projecting through the circular opening 16 of disk 13 as previously described while the other U-shaped end 23 is bent around the outer edge 21 of the said disk as has also been described. The U-shaped staples 24 and 25 are now put into place as told in the construction of this novel invention. The washer 27 is also secured in place and the entire collar is now firmly secured in place on the chinchilla's neck. It is, of course, necessary to be sure that the device is so placed on the chinchilla's neck that the strap 22 is under the mammal's throat and not above his or her neck.

From the foregoing it will now be seen that there is herein provided a collar for preventing fur chewing which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

Although this invention has been developed for chinchillas, it is not to be limited to that mammal nor is its material necessarily limited to metal as it can be manufactured of any desired material and in any desired size and plan form if so desired.

In accordance with the provisions of the United States patent statutes, as stated in the United States Code Title 35, Patents, I have now described the principle of construction and operation of my invention of collar for preventing fur chewing in the form which I personally consider the best embodiment thereof, and what I now claim as my invention and desire to secure by Letters Patent is:

A collar for preventing fur chewing of the character described, comprising a disk having a centrally located opening therein for the head of a chinchilla to project through when the said collar is placed on the neck of the same, and a ring mounted edgewise on the front of the said disk and secured to the said disk by means of a plurality of trapezoidal shaped arms extending from one edge of the periphery of the said ring in radial and equal spaced relation to each other, the said arms passing through appropriate recesses in the periphery of the said disk and then bend down on the back surface of the said disk thereby firmly holding the said ring to the said front of the disk, the said ring being provided with a cut-out on its lowermost portion thereof, and the said disk having a slit extending radially from the centrally located opening therein to the outermost edge thereof and a strap having U-shaped ends adapted to the front side of the said disk with one U-shaped end of the said strap projecting through the lowermost portion of the centrally located opening and the other one of the U-shaped ends of the said strap adapted to fit around the lowermost portion of the outer edge of the said disk to which the said strap is secured by means of two U-shaped staples projecting through suitable openings in the said disk and then being bent in a locked position while a ring of suitable material is adapted to the backside of the lowermost one of the U-shaped staples thereby securely locking the said collar in place on the neck of a chinchilla.

References Cited in the file of this patent

UNITED STATES PATENTS

| | | |
|---|---|---|
| 2,956,542 | Mueller | Oct. 18, 1960 |
| 3,013,530 | Zeman | Dec. 19, 1961 |
| 3,036,554 | Johnson | May 29, 1962 |

OTHER REFERENCES

The Washington Post, page 1, section I, Feb. 25, 1940.